March 17, 1970 — G. W. MEEK — 3,500,615
GAS AND LIQUID CONTACT APPARATUS
Filed July 7, 1967

INVENTOR.
George W. Meek
BY

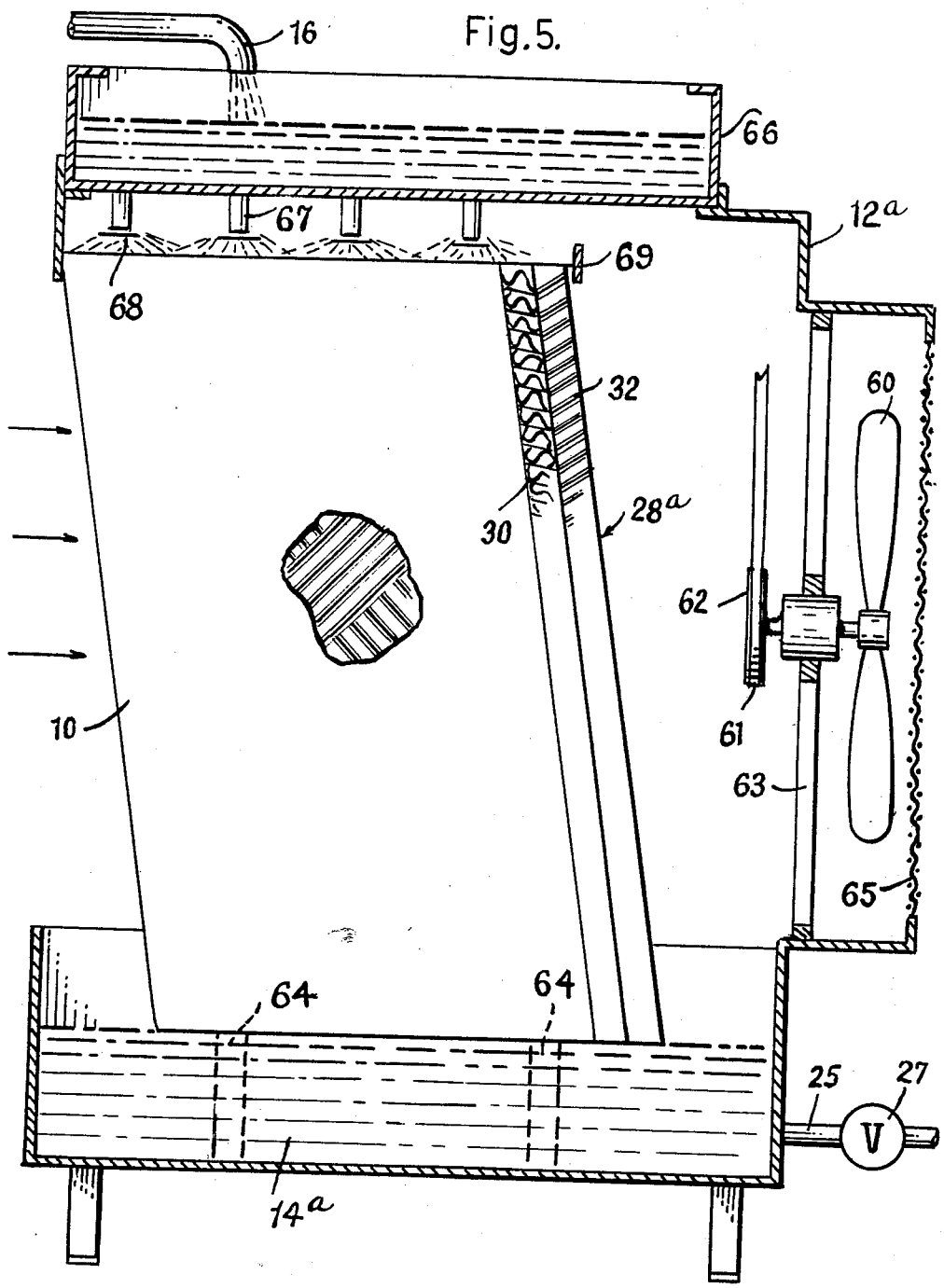

United States Patent Office 3,500,615
Patented Mar. 17, 1970

3,500,615
GAS AND LIQUID CONTACT APPARATUS
George W. Meek, Fort Myers, Fla., assignor to Carl Munters & Co., Stocksund, Sweden, a Swedish company
Filed July 7, 1967, Ser. No. 651,731
Claims priority, application Sweden, Feb. 21, 1967, 2,374/67
Int. Cl. B01d 41/04, 47/00
U.S. Cl. 55—233          3 Claims

ABSTRACT OF THE DISCLOSURE

A drift eliminator comprising at least two contiguous units, each of which has a multiplicity of intersecting and intercommunicating passages to allow passage of gas and liquid therethrough and adapted to be positioned across the air discharge opening of the housing in which a contact body is enclosed to preclude splashing of liquid from the housing.

BACKGROUND OF THE INVENTION

This invention relates more particularly to cooling towers and the like wherein heat is removed from the water by causing the latter to gravitate through a fill assembly in heat exchange relationship with currents of air, whereby the temperature of the water is lowered by surface evaporation before being returned to the equipment employing the water for various thermal interchange functions.

SUMMARY OF THE INVENTION

Cooling towers of the type referred to have a casing enclosing the fill assembly as well as a water distributing device overlying the fill and a basin beneath the fill assembly for collecting the water running by force of gravity through the interstices or passages in contact with currents of air which are drawn through the fill usually by a power driven fan suitably disposed within the casing, and then ultimately discharged through the air outlet of the casing.

Because of the tendency of the water particles to drift or be carried along with the rapidly moving air currents towards the air outlet, drift eliminators are normally provided adjacent the air discharge face of the fill assembly to eliminate or minimize water loss from the casing through the air discharge opening therein.

It is among the objects of the invention to provide a drift eliminator for gas and liquid contact apparatus, such as cooling towers for air conditioning systems, which has improved efficiency in precluding loss of water from the casing through the air discharge outlet with a minimum of pressure drop in the air stream and without substantially interfering with the flow of air through the fill.

A further object is to provide a drift eliminator unit having the above-mentioned characteristics which is relatively thin and which takes up very little space in the casing.

Still another object is to provide a self-sustaining gas and liquid contact body having a structure which enhances its rigidity and resistance to torsional and other mechanical stress.

Other objects and details of construction of the invention will be apparent from the following description given by way of example with reference to the accompanying drawings, which disclose a preferred embodiment of the inventive concept.

BRIEF DESCRIPTION OF THE DRAWING

In the drawings:

FIG. 5 is a sectional view of a cross-flow cooling tower partly in section equipped with a drift eliminator according to the invention.

DESCRIPTION OF THE PREFERRED EMBODIMENT

Figure 1:
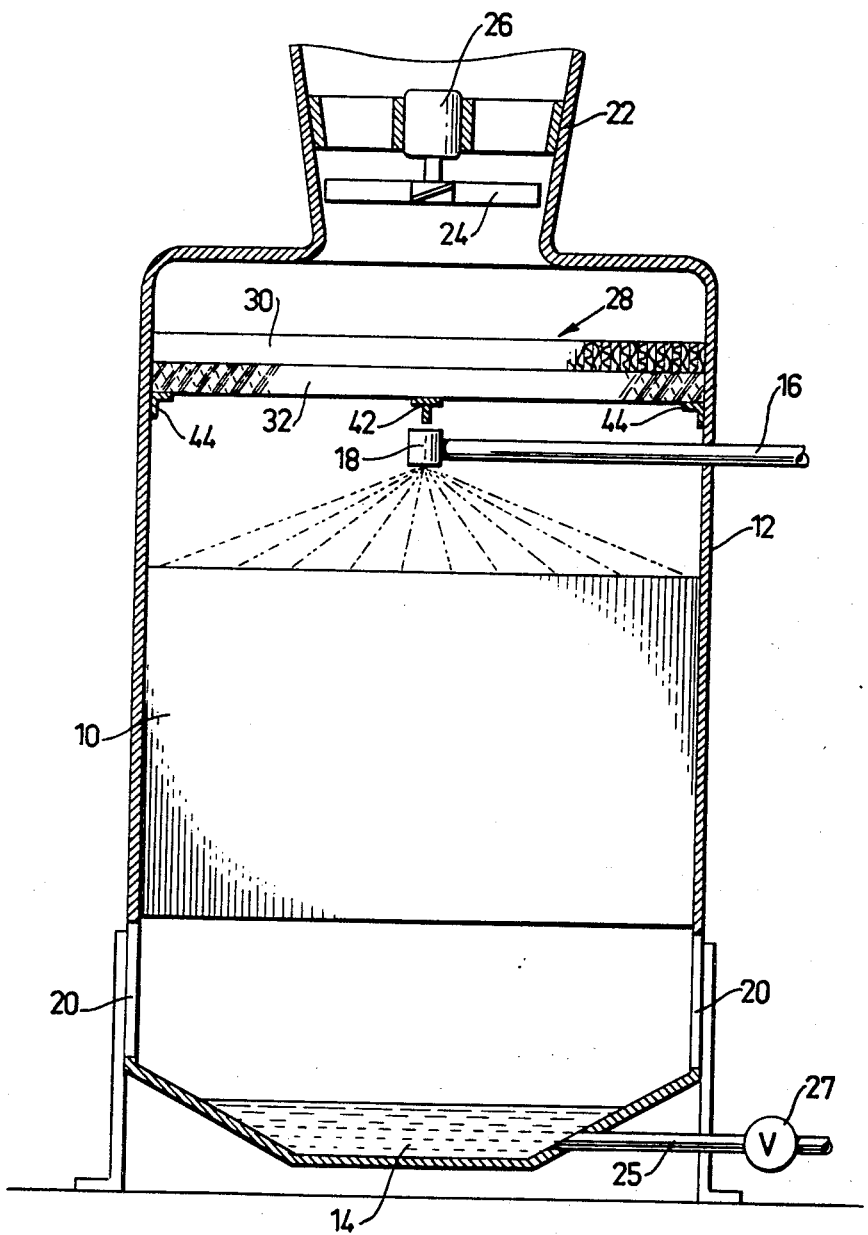
FIG. 1 is a vertical section of a counter-flow cooling tower provided with a drift eliminator according to the invention.

Referring to FIG. 1, the reference numeral 10 indicates the contact body or fill which is enclosed within the casing 12 having a water basin or sump 14 at the bottom thereof.

The contact body or fill may be of conventional type, but in the embodiment shown in FIG. 1, it comprises a series of parallel spaced sheets of cellulosic or asbestos paper or of plastic material forming a mass of vertically extending passages. These sheets may all be corrugated or only alternate sheets may be corrugated and joined to an intermediate plane sheet as shown in U.S. Patents Nos. 2,809,817 and 2,809,818. Other forms of fill suitable for the invention are shown in U.S. Patent 3,262,682, and in my copending application Ser. No. 565,459 filed July 15, 1966, now U.S. Patent No. 3,395,903 in which the corrugations of adjacent sheets cross one another.

Water is supplied through the pipe 16 and sprayed over the top face of the packing or cooling tower fill by the distributor 18, and runs along the surfaces of sheets principally in a vertical direction.

Air is drawn into the casing through the air inlet opening 20 and upwards through the passages in the fill by means of the fan 24 which is driven by the motor 26 mounted in the air discharge opening 22.

The air and water thus flow in contact with each other through the passages in the packing or fill, whereby heat is removed from the water by evaporation in the air. The thus used air is discharged to the atmosphere through the discharge opening 22 while the cooled water is collected in the sump 14 from which it is removed through the pipe 25 and the valve 27 to the place of employment.

The drift eliminator generally indicated by the arrow 28 is mounted in the casing 12 above the fill and extends over the entire cross sectional area thereof. The drift eliminator according to the invention comprises a plurality of relatively thin sections or slices. In the embodiment shown it comprises two slices 30 and 32 each of which is formed of a plurality of facially opposed corrugated strips 34, 36, disposed in substantially parallel relationship, but with the corrugations of adjacent sheets 38, 40 crossing one another as clearly shown in FIG. 3. The resultant structure forms a mass of intersecting and intercommunicating passages allowing gas and liquid to pass therethrough. The strips are relatively thin on the order of some tenths of a millimeter in thickness. The strips are preferably made of cellulose fiber matrial or of inorganic material, such as asbestos and plastic sheet material, such as polyvinyl chloride. When made of fibrous material, they may be given wet strength by impregnation with a suitable substance, such as a resinous material, for example, phenolic or melamine resin. The adjacent strips are bonded to each other at at least some of their points of contact such as by means of a similar resinous material or by plastic welding. The corrugations 38, 40 incline at an angle to the vertical, which preferably is about 30°, but may range between 20°–50°. Obviously, two crossing corrugations form an angle between them which is the sum of their respective angles.

The strips may be either wettable or water-absorbent. These characteristics can be imparted to the impregnated fibrous material by selecting the proper proportions of the amount of resin. The strips in each of the slices 30 and 32 are arranged in parallel direction, but the strips in one of the slices extend at an angle to the strips in the other slice. The angle is preferably 90° so that the strips in one slice extend at a right angle to the strips in the other slice. Each slice forms a multiplicity of intersecting and intercommunicating passages which extend throughout the slices vertically as in the entire horizontal width of the slice with repeatedly varying width from 0 at the points of contact to the double height of corrugations. Said height may amount to 5–20 and preferably 10–14 mms. When the strips in the two slices 30 and 32 extend perpendicularly to each other, the passages in the respective slices also extend at a 90° angle to one another.

In the bottom slice 32, the lower edge 37 may terminate a distance above the lower edge 39 in the adjoining strip 36. This is for the purpose of providing better drainage of water from the slice, particularly when large amounts of water are carried along by the air stream and when the height of the corrugations is relatively small. This arrangement makes the spacing between the lower edges 39 of the strips 36 sufficiently wide so as to tend to prevent bridging by reason of surface tension or by the capillary force which would create a resistance to the air stream. Other means to attain this objective may be used, such as the drainage tips shown in the above-mentioned Patents Nos. 3,809,817 and 2,809,818.

Figure 2:
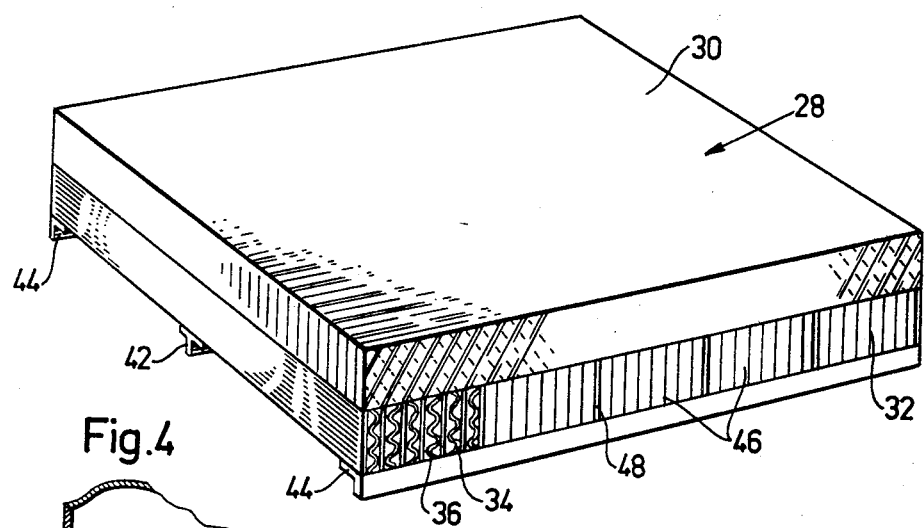
FIG. 2 is a perspective view of the drift eliminator according to the invention drawn to an enlarged scale.

The bottom slice 32 is supported on brackets 42, 44 mounted on the wall of the casing. The bottom slice may comprise a series of narrow sections 46 as shown in FIG. 2 which are interconnected by the strips or partitions 48, which are made of substantially thicker material, such as asbestos, cement or galvanized steel, than the strips 34, 36. These partitions extend perpendicularly to the brackets 42, 44, and have about the same height as the asbestos strips. The partitions may be glued to the individual sections 46, and their object is to reinforce the supporting capacity of the slice 32. The top slice 30 which rests on the slice 32, on the other hand, may be formed as a single unit from the strips 34, 36 since these do not require any special reinforcing structure. The slice 30 may rest loosely on the top of the slice 32 or be glued to the latter. The last-mentioned alternative is particularly desirable when the bottom slice lacks any reinforcing supporting structure.

Figure 4:
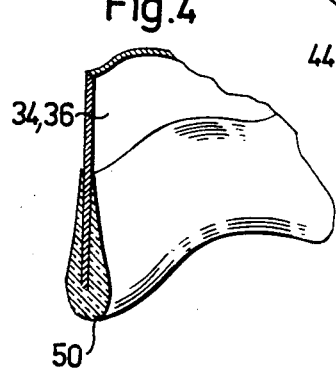
FIG. 4 is an enlarged detail view of a strip shown in FIG. 3.

The individual strips 34, 36 may be provided with beads 50 of plastic material or the like, as shown in FIG. 4, to toughen the face edges of the slices, in other words, on the top face of the slice 30 and the bottom face of the slice 32. An example of how these edges may be toughened is shown in my copending application Ser. No. 565,459, filed July 15, 1966. These toughened edges impart to the two slices which are glued to one another and have their strips extending angularly to one another, an extremely good mechanical strength.

Experiments have shown that two slices 30 and 32 according to the invention each having a thickness of about 5 cm. have the same capacity of precluding water from splashing out of the casing as a single unit of the same construction having a thickness of about 15 cm. This favorable effect depends on the changes of directions which the air flow carrying the water particles undergoes at the passage from one slice to the next one. In addition, the feature of the strips in one slice extending at an angle across the strips of the contiguous slicer enhance the rigidity of the structure and reinforces it against torsional and other mechanical stresses.

In the modification shown in FIG. 5, the air is drawn through the contact body or fill in the direction shown by the arrows through the drift eliminator generally indicated by the arrow 28a by means of suction created by the fan 60 suitably located adjacent the air outlet 63, and propelled by a motor, not shown, the sprocket wheel 61 and chain belt 62. The contact body or packing is supported on the floor of the sump 14a by means of brackets 64. The air outlet 63 may be provided with a protective foraminous screen 65. Provided at the top of the packing is a water distributing tank 66 which is supported on a ledge portion 12b of the housing 12a, and water or other liquid is supplied by the pipe 16. This tank 66 is provided with a number of suitably located drains 67 and the liquid streams may be broken up into a fine spray by splash disks 68 or similar means.

Figure 3:
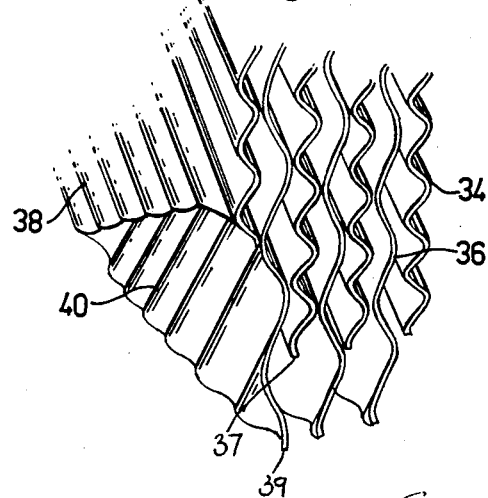
FIG. 3 is a perspective fragmentary view of the drift eliminator drawn to a still larger scale.

The drift eliminator 28 is of the same means as shown in the embodiment in FIGS. 1–3, and is held in position at the air outlet side of the packing by means of the bracket 69. In this embodiment the slice 30 faces the air outlet area of the packing whereas slice 32, faces the air outlet opening 63 of the housing 12a. By virtue of this arrangement the water particles entrained in the drift eleminator will run down the inclined surface of slice 32 into slice 30 and back into the packing or contact body 10, from which the water is drained into the sump 14a from which it is removed through the pipe 25 and valve 27 as in the embodiment shown in FIG. 1.

The longitudinal dimension of the strips of the drift eliminator is the strip dimension in the direction of gas flow between the inlet side of the drift eliminator and the outlet side of the drift eliminator.

What I claim is:

1. A gas and liquid contact apparatus comprising a casing having gas inlet and gas outlet, said casing containing a packing substantially filling the cross section of the casing and positioned intermediate said inlet and said outlet, said packing having passages through which liquid flows by gravity in heat exchange relationship with currents of gas passing through said passages, means overlying, the packing for supplying water to said packing, a drift eliminator disposed across the air discharge face of the said packing, said drift eliminator comprising:
    (a) at least two contiguous slices which are in facial engagement with one another;
    (b) each of said slices comprising a plurality of corrugated strips, said strips being disposed in facially opposed relationship to one another and in substantially parallel relationship to one another and defining a plurality of intersecting and intercommunicating passages allowing the passage of gas and liquid therethrough;
    (c) the corrugation in each of said strips extending at an angle to the main direction of flow of the gas through the casing from said gas inlet to said gas outlet with the corrugations in alternate strips being disposed at an angle to the corrugations in the strips disposed between the alternate strips;
    (d) the strips in one of said slices extending at right angles to the strips of the contiguous slice, at least one of said slices comprising a plurality of units interconnected by solid substantially planar, rigid partition walls of self-supporting material to reinforce said one slice.

2. A gas and liquid contact apparatus according to claim 1, in which the strips are composed of asbestos paper.

3. A gas and liquid contact device through which liquid flows by gravity in heat exchange relationship with currents of gas and passing transversely therethrough, comprising:
    (a) a contact body having an air outlet area and composed of a plurality of corrugated sheets facially opposed to one another and composed of asbestos paper and disposed in a substantially vertical, parallel relationship with one another and forming a plurality of intersecting and intercommunicating open-ended passages allowing the gas to pass in cross-current relationship to the liquid, the corrugations in each of said sheets being disposed at an angle to the horizontal with the corrugations in alternate sheets crossing the corrugations in the sheets disposed between the alternate sheets;

(b) a drift eliminator disposed across the air outlet area of said contact body;

(c) said drift eliminator comprising at least two contiguous abutting units;

(d) each of said units comprising a plurality of corrugated sheets facially opposed to one another and composed of asbestos paper and disposed in substantially parallel relationship to one another, and forming a plurality of intersecting and intercommunicating open-ended passages, the longitudinal dimension of the strips in one unit extending in a substantially horizontal direction and the longitudinal dimension in the strips of the abutting unit extending in a substantially vertical direction;

(e) means of supplying liquid to and distributing it over said contact body;

(f) means including a casing having a gas inlet and a gas outlet positioned with said contact body, drift eliminator and means for supplying liquid, disposed therebetween within said casing for passing currents of gas through said contact body with crossflow relationship to the liquid flow;

(g) a sump in the lower portion of said casing for liquid collection and disposed below the contact body and provided with a valve and outlet;

(h) the strips in one of said units extending at right angles to the strips of the contiguous unit; and (i) at least one of said units comprising a plurality of units interconnected by solid substantially planar rigid partition walls of self-supporting material to reinforce said one unit.

References Cited

UNITED STATES PATENTS

| | | | |
|---|---|---|---|
| 1,848,576 | 3/1932 | Sandel | 55—489 X |
| 2,079,297 | 5/1937 | Manning | 55—488 |
| 2,653,676 | 9/1953 | Breckheimer | 55—521 X |
| 2,669,995 | 2/1954 | Troy | 55—520 X |
| 2,809,818 | 10/1957 | Munters. | |
| 2,906,512 | 9/1959 | Meek | 261—98 X |
| 3,025,964 | 3/1962 | Summers et al. | 210—493 |
| 3,031,173 | 4/1962 | Kohl et al. | |
| 3,065,587 | 11/1962 | Fordyce et al. | |
| 3,070,937 | 1/1963 | Bob | 55—489 X |
| 3,112,184 | 11/1963 | Hollenbach. | |
| 3,189,335 | 6/1965 | Fuller et al. | |
| 3,226,098 | 12/1965 | Shryock. | |
| 3,260,511 | 7/1966 | Greer. | |
| 3,262,682 | 7/1966 | Bredberg | 261—112 X |
| 3,272,484 | 9/1966 | Brand et al. | 261—112 X |
| 1,560,790 | 11/1925 | Jordahl | 55—501 X |
| 2,019,186 | 10/1935 | Kaiser | 55—440 X |
| 1,598,087 | 8/1926 | Mathis | 55—492 |
| 2,252,242 | 8/1941 | Wood | 55—249 |
| 2,376,341 | 5/1945 | Burk et al. | 261—112 |
| 2,780,306 | 2/1957 | Boyle et al. | 55—484 X |
| 3,090,180 | 5/1963 | Berz et al. | 55—484 X |
| 3,395,903 | 8/1968 | Norback et al. | 261—112 |

FOREIGN PATENTS

| | | |
|---|---|---|
| 222,533 | 7/1959 | Australia. |
| 445,110 | 3/1948 | Canada. |
| 374,849 | 5/1923 | Germany. |

OTHER REFERENCES

German printed application (A) No. 1,058,077, printed May 1959.

German printed application (B) No. 1,115,750, printed October 1961.

HARRY B. THORNTON, Primary Examiner

DENNIS E. TALBERT, JR., Assistant Examiner

U.S. Cl. X.R.

55—241, 257, 278, 483, 489, 521; 261—94, 100, 112, 117